Patented Apr. 27, 1954

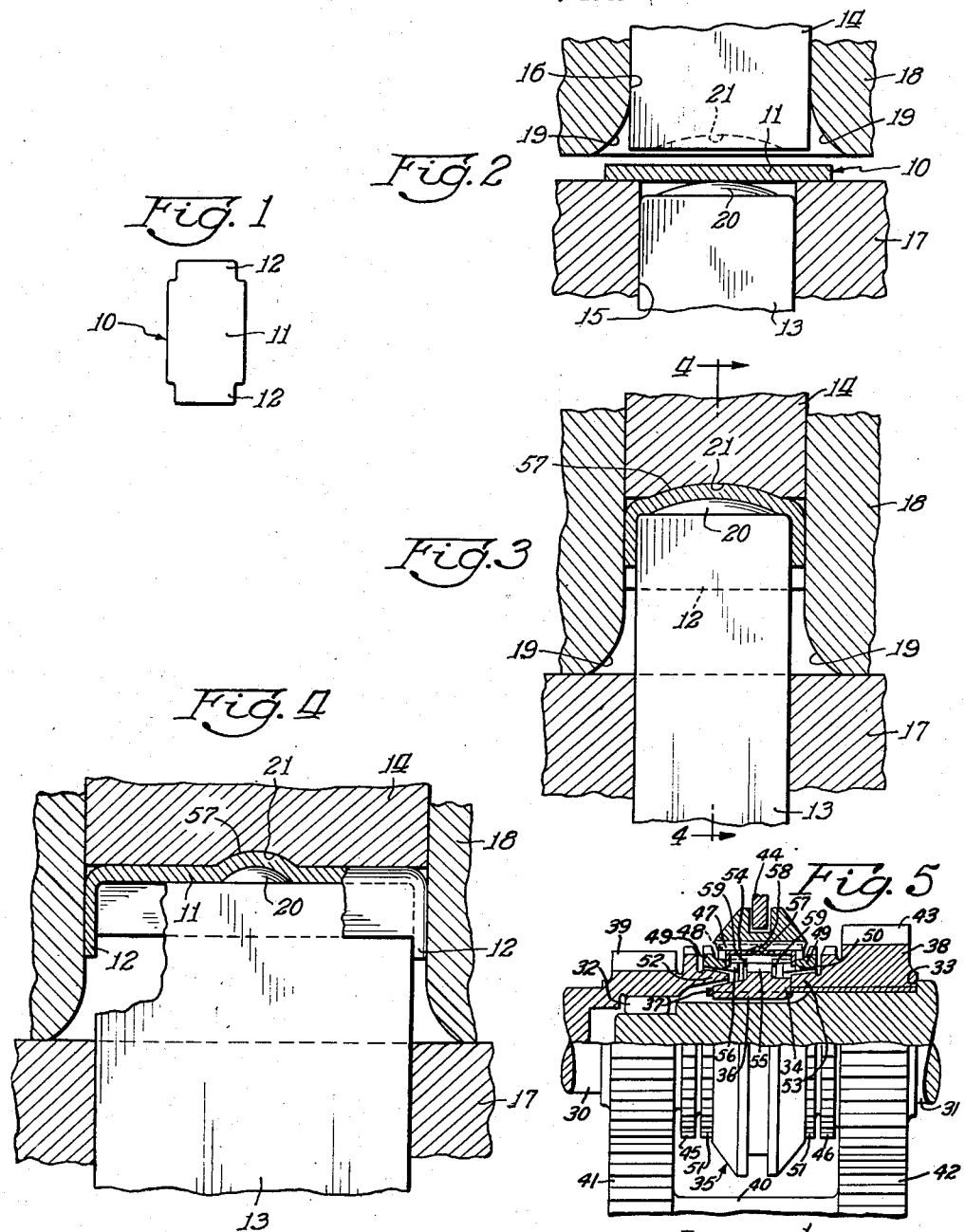

2,676,684

UNITED STATES PATENT OFFICE 2,676,684

SYNCHRONIZED CLUTCH WITH THRUST BAR

Kenneth M. Armantrout, Muncie, Ind., assignor to Borg-Warner Corporation, Chicago, Ill., a corporation of Illinois Application December 11, 1948, Serial No. 64,820

1 Claim. (Cl. 192—53)

This invention relates to transmissions and more particularly to thrust bars for use in synchromesh type transmissions and to methods for making the same.

Thrust bars, or shifter plates, are widely employed in certain types of synchromesh transmissions and where so used generally perform two functions. The thrust bars, upon being urged forward by the sliding collar of the shift mechanism, which is in turn moved by the shifting lever, push the synchronizer or blocker ring forward into frictional engagement with the cooperating surface of the gear to be synchronized and at the same time, by entering into suitable slots formed in the ring, connect the ring in driving relationship to the drive shaft, thereby causing the ring to rotate in synchronism with the drive shaft. In performing the first of these two functions, the thrust bar carries the entire axial pressure occasioned in pressing the synchronizer ring against the cooperating surface of the gear to be synchronized and accordingly the end of the thrust bar is subjected to considerable longitudinal stress. This stress tends to bend the end of the thrust bar backward. In practice, it has been found that unless the end of the thrust bar is made particularly resistant to this bending action, the end portion may be flexed sufficiently over a period of use to be actually broken off. Furthermore, in performing the second function, the end of the thrust bar, as it engages the side of the slot in the synchronizer ring, is subjected to a shearing stress exerted at right angles to the bending stress, thus increasing the tendency to deformation and possible ultimate breakage. It readily will be apparent to those skilled in the art that deformation or breakage of a thrust bar is a serious problem and particularly so because of the relative inaccessibility of the thrust bars when the transmission has been assembled and placed in use.

Since the development of this type of synchromesh transmission, numerous efforts have been made to provide thrust bars which will stand up in service and not be deformed or otherwise necessitate replacement. United States Patent No. 2,221,900, issued November 19, 1940 to White et al., exemplifies some of these efforts and discloses various forms of thrust bars that have met with some success. This patent discloses in general three forms of thrust bars: Fig. 3 shows a thrust bar comprising a solid block of metal. This form is relatively difficult to manufacture and undesirably heavy. A second form is illustrated in Fig. 6 of this patent and comprises an elongated rectangular primary plate having the requisite surface configuration and having the two ends thereof bent downwardly at right angles. This plate is reinforced by a second plate wedged between the ends of the primary plate. This second form is obviously a more complicated structure than would ordinarily be desired and unless the primary and secondary plates are rigidly secured together as by welding, there is considerable danger of the plates being pulled apart. A third form of thrust bar is that illustrated in Fig. 8 and comprises a stamping in which the end and side members are bent downwardly from a rectangular top portion to form a generally box-like structure, the side members tending to provide some longitudinal support for the end members by virtue of their location. However, substantially no improvement is obtained in resistance to the shearing stress to which the end members are subjected in service.

An object of the present invention is to provide a new and improved thrust bar and a simple and efficient method of making the same.

A further object of the present invention is to provide a thrust bar of economical design which will have improved resistance to both longitudinal and shearing stresses.

In accordance with one embodiment of this invention, a thrust bar of substantially box-like configuration may be formed in a combined drawing and bending operation from a substantially rectangular blank of sheet metal having tabs at either end. In the forming operation, the sides of the box-shaped thrust bar are drawn so that all four sides are integral with the top portion of the bar and also integrally joined with each other to form in effect a continuous rim about the periphery of the top portion, the rim extending downwardly therefrom. At the same time, due to the bending of the tabs, the tabs are moved to occupy a position 90° from their original position in the blank and to extend beyond the lower edge of the side portions of the rim.

Other objects and advantages of the present invention will be apparent from the following detailed description taken in conjunction with the drawings wherein:

Fig. 1 is a plan view of a blank from which a thrust bar may be formed in accordance with this invention;

Fig. 2 is an enlarged, fragmentary, transverse, sectional view of a combined drawing and bending die which may be employed in accordance with one embodiment of this invention;

Fig. 3 is a view similar to Fig. 2 showing the position of the die members and the shape of the thrust bar at the completion of the drawing movement of the die;

Fig. 4 is a sectional view taken along the line 4—4 of Fig. 3; and

Fig. 5 is an axial sectional view of a transmission synchronizer embodying the invention.

Referring first to Fig. 5 of the drawing there is shown therein a synchronizing transmission including a pair of aligned torque-transmitting members 30 and 31, the forward end of the member 31 being piloted, as at 32, in the rear end of the member 30. The member 30 may be the driving shaft of a conventional automobile transmission, and the member 31 the driven shaft of such a transmission. A hub 34 is secured to the shaft 31 as by means of a splined connection 36, and is located against axial movement by a retaining ring 37, on one side, and a reduction geared torque-transmitting member 38 on the other side, the latter being mounted against a shoulder 33 formed on the shaft 31.

The reduction geared member 38 is driven from the drive shaft 30 through constant mesh gearing including a gear 39 formed on the drive shaft 30, a countershaft 40 having a gear 41 meshing with the gear 39, and having a second gear 42, and a gear 43 formed on the torque-transmitting member 38 and meshing with the gear 42.

A positive drive connection is adapted to be established between the torque-transmitting members 30 and 31, or between the reduction geared torque-transmitting member 38 and the member 31 by an axially movable jaw clutch element 35 formed with internal clutch teeth 47, in sliding splined engagement with teeth 48 forming the periphery of the hub member 34, and adapted to be shifted axially by a shifting fork 44 to bring the teeth 47 into positive clutching engagement with clutch teeth 45 formed on the torque transmitting member 30, or clutch teeth 46 formed on the torque-transmitting member 38.

Upon being moved into clutching engagement with the teeth 45, the movable clutch element 35 will receive rotation from the drive shaft 30 and transmit it directly through the hub 34 to the driven shaft 31. Upon being moved in the opposite direction into clutching engagement with the teeth 46, the movable clutch element 35 will receive rotation from the torque-transmitting member 38 through the countershaft 40, and will transmit such rotation through the hub member 34 to the driven shaft 31.

In order to synchronize either torque-transmitting member 30 or 38 with the movable jaw clutch element 35, preparatory to establishing such positive clutch engagement, there is provided a pair of synchronizer rings 49, each including a substantially cylindrical collar portion 50 rotatably mounted within the rim portion of the hub 34, and a peripheral portion which is provided with blocker teeth 51 between which the teeth 47 of the movable jaw clutch element must pass before the clutching engagement with the teeth 45 or 46 may be established. The opposed ends of the teeth 47 and 51 may be chamfered, in accordance with well known practice. The synchronizer rings 49 are provided with internal conical friction clutch faces adapted to engage complementary external conical friction clutch faces of friction clutch elements 52 and 53 respectively, formed on the torque-transmitting members 30 and 38.

The mounting of the synchronizer rings 49 within the rim of the hub 34 is such as to allow them to move both circumferentially and axially with respect to the hub. The axial movement enables them to establish engagement with their respective cooperating friction clutch elements 52 and 53. Such axial movement is transmitted to a synchronizer ring from the movable jaw clutch element 35 during the initial stage of shifting movement thereof, through the medium of a thrust bar or a plurality of thrust bars 54, which are interposed between the movable jaw clutch sleeve 35 and the hub 34, and received in notches 55 in the periphery of the hub 34. The thrust bars 54 are confined against circumferential movement by the notches 55, but are free to slide longitudinally therein in paths parallel to the axis of the torque-transmitting members 30 and 31.

The ends of the thrust bars 54 are received in notches 56 in the synchronizer rings 49, and are abutted against the rings 49 so as to transmit axial thrust thereto.

The notches 56 are wider than the ends of the bars 54 so as to allow a limited amount of circumferential shifting movement of the synchronizer rings relative to the hub, whereby a synchronized ring may shift from a position in which the blocker teeth 51 are effective to block axial shifting movement of the movable jaw clutch sleeve 35, to a position in which the movable jaw clutch sleeve 35 may pass on into clutching engagement with a jaw clutch element 45 or 46. By thus utilizing the projecting ends of the thrust bars for engagement in notches in the synchronizer rings, we eliminate the necessity of employing separate connecting means for establishing a lost motion connection between the synchronizer rings 49 and the hub 34. However it is to be understood that other forms of lost motion connection, well known in the art, may be employed.

In the preferred form of the invention, the transmission of axial thrust from the movable jaw clutch element 35 to the thrust bars 54 is provided for in the form of a break-away connection comprising a projection 57 formed integrally in the central region of a thrust bar, and a corresponding recess 58 in a tooth or teeth 47 of the movable jaw clutch sleeve 35, in which recess 58 the projection 57 is engageable.

The thrust bars 54 are yieldingly urged radially outwardly by a pair of resilient expander rings 59. The rings 59 are received between the web portion of the hub 34, and the opposed extremities of the collar portions 50 of the synchronizer rings 49. They are formed with a normal diameter greater than the diameter of the inner sides of the assembled thrust bars 54, so that when assembled, they are biased under compression so as to urge the bars radially outwardly into engagement with the interior of the movable jaw clutch sleeve 35.

The manner whereby the thrust bars 54 may be made and the details of configuration thereof will now be described.

Referring now to Fig. 1 wherein a blank 10, which may be formed from a sheet metal strip is illustrated, it will be noted that the blank comprises an elongated, substantially rectangular body portion 11 having at either end thereof a tab 12 comprising essentially an extension of the body portion but being of somewhat narrower width. Such a blank may be readily punched from a strip, or partially punched from a strip and then carried in the strip to the next step, as for example in a continuous punching and drawing apparatus.

In the combined drawing and bending operation of this invention, the blank 10 is positioned in a die press shown fragmentarily in Figs. 2, 3, and 4. The die press comprises cooperating lower and upper die members 13 and 14 of rectangular cross section, the die members 13 and 14 being slidably journaled in suitable apertures 15 and 16, respectively, formed in a stripper plate 17 and upper die block 18. The lower die member 13 is made sufficiently smaller in cross section than the aperture 16 formed in the die block 18 to provide the drawing action as the die member or ram 13 is moved upwardly to bring the blank into engagement with the die member 14 and block 18.

The entrance to the aperture 16 is beveled as indicated at 19 both to facilitate the initial drawing action and also to provide the bending action which causes the tabs 12 to be bent at right angles to the body portion 11 of the blank 10 as the ram 13 is moved upwardly. Upward movement of the ram 13 compresses the peripheral area along the sides of the blank 11 and adjacent the tabs 12, drawing the metal in this area to form the sides and ends of the thrust bar. By virtue of the drawing action the ends of the thrust bar 25 form a continuous band or flange extending downwardly at right angles from the rectangular periphery of the central portion of the blank 10, thus providing an open ended substantially box-like structure. The tabs 12 extend somewhat beyond the lower edge of the structure but in the same plane therewith as clearly indicated in Fig. 4.

The lower die member 13 has a boss 20 of elongated transverse cross section formed in the center of its upper surface and this boss cooperates with a slightly larger recess 21 of similar configuration formed in the lower end of the upper die member 14 to form the hump or projection indicated at 57 on the completed thrust bar in Figs. 3 and 4. The boss 20 and cooperating recess 21 are preferably shaped so that the hump will have a prolate, hemispheroidal surface configuration, being generally elliptical in cross section and having its long dimension disposed at right angles to the long dimension of the thrust bar 54. It will be understood that this hump 57, in cooperation with the recess or annular groove 58 formed on the interior of the sliding collar 35 of the transmission shifting mechanism causes the thrust bar 54 to move initially with the sliding collar 35, the hump 57 being urged into the groove 58 by the rings 59 which bear against the underside of the thrust bar 54 and are retained in position thereagainst by the tabs 12. Because the hump 57 is only resiliently pressed against the sides of the annular groove 58, increased pressure on the shift lever 44 causes the sliding collar 35 to break away from the thrust bar 54 to establish the positive clutch engagement. The particular surface configuration of the thrust bar hump 57 in accordance with this invention is not only simple to form in the same drawing operation wherein the sides of the thrust bar 54 are formed, but also is especially suited for the breakaway action required.

By correctly proportioning the die members and associated elements and limiting their upward travel, it will be evident that it is feasible, in accordance with the present invention, to restrict the drawing action so that while the tabs 12 are moved to occupy in the thrust bar 54 a position substantially 90° from their original position in the blank, the tabs actually are subjected to no drawing action. On the other hand, it is possible also, in accordance with the present invention, to both bend the tabs in the manner stated, and also to draw the tabs to increase for example the amount of projection. Finally, it is also possible, in accordance with the present invention, to form the tabs completely in the drawing operation from a simple rectangular block. Such drawing necessarily reduces the thickness of the end portions of the thrust bar and thereby the inherent strength and, consequently, where the tabs are also formed in the drawing operation ordinarily the blank must be made of somewhat thicker material than otherwise or of material which is thicker adjacent the ends of the blank.

It is to be noted that the drawing operation lends itself particularly well to the forming of rounded edges and corners. Such rounded edges and corners are generally desired in order to facilitate entry of the thrust bars into the slots 56 formed in the synchronizer rings 49. Thus this method avoids the usually necessary additional step of chamfering the ends of the thrust bar, since this is readily accomplished in the drawing operation. Furthermore, while drawing tends to reduce the thickness of the metal, at the same time like forging, because it increases the density of the metal by compression, it increases the unit strength, thus compensating for the decrease in thickness.

From the foregoing it will be evident that the thrust bar in accordance with this invention combines the best features of previous designs while avoiding their disadvantages. By joining the sides and ends as a continuous rim, the sides and ends reinforce each other in the areas of critical stress and it has been found in practice that this design of thrust bar is durable and highly resistant to deformation or breakage. At the same time this design is readily manufactured in accordance with the method of this invention in a simple and economical manner.

What is claimed is:

In a transmission synchronizer, three coaxial torque transmitting members, a pair of synchronizer elements respectively drivingly associated with one of said members, each of said synchronizer elements being shiftable axially for respectively establishing a frictional driving connection between said one member and the other two of said members, a jaw clutch sleeve encircling said one member and drivingly connected thereto and shiftable axially in opposite directions for respectively establishing a positive driving connection between said one member and either of said other two members, said one member including means defining a plurality of axially extending slots and said synchronizer elements each including means defining an equal number of notches, and a plurality of thrust bars respectively disposed in said slots in said one member, each of said thrust bars comprising a hollow box-like structure having a substantially rectangular cross portion and sides depending therefrom and bent at substantially right angles thereto, the sides of each of said thrust bars being integral with the cross portion thereof and being integral with each other so that said sides form an integral continuous band extending about the periphery of the cross portion, a pair of said depending sides on each of said thrust bars being opposed to each other and being formed with tabs thereon respectively adapted to be received in the slots in said synchronizer elements, and each of said thrust bars having a hump formed substantially in the center of its cross portion which hump is adapted to yieldingly engage said jaw clutch sleeve such that upon axial shifting movement of said sleeve axial thrust therefrom is transmitted through the humps to the thrust bars and thence to one of the synchronizer elements through one of the opposed pair of depending sides on each of said thrust bars for establishing the frictional driving connection between said one member and one of said other two members.

References Cited in the file of this patent

UNITED STATES PATENTS

| Number | Name | Date |
|---|---|---|
| 1,682,348 | Porter | Aug. 28, 1928 |
| 1,974,981 | Carvahlo | Sept. 25, 1934 |
| 2,067,459 | Noll et al. | Jan. 12, 1937 |
| 2,179,568 | White | Nov. 14, 1939 |
| 2,201,149 | Best | May 21, 1940 |
| 2,221,893 | White | Nov. 19, 1940 |
| 2,221,900 | White et al. | Nov. 19, 1940 |
| 2,221,901 | Barr | Nov. 19, 1940 |
| 2,312,749 | Bullock | Mar. 2, 1943 |
| 2,459,561 | Yawman | Jan. 18, 1949 |